United States Patent Office 2,703,326
Patented Mar. 1, 1955

2,703,326

3β,11α-DIHYDROXY-5-PREGNENE-7,20-DIONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952,
Serial No. 296,743

7 Claims. (Cl. 260—397.45)

The present invention relates to the preparation of 3β,11α-dihydroxy-5-pregnene-7,20-dione and 3β,11α-diacyloxy-5-pregnene-7,20-diones.

The compounds of the present invention are represented by the formula:

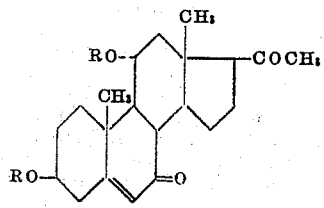

The esters are prepared by the acylation of 3β,11α-dihydroxy-5-pregnene-7,20-dione. The 3β,11α-dihydroxy-5-pregnene-7,20-dione is prepared by subjecting pregnenolone (3β-hydroxy-5-pregnene-20-one) to the oxygenating action of the culture of fungus of the order Mucorales as set forth in our application Serial No. 296,740, filed July 1, 1952, now abandoned, and our applications, of which the present application is a continuation-in-part, Serial No. 180,496, filed August 19, 1950, now abandoned, and Serial No. 272,944, filed February 23, 1952, issued July 8, 1952, as Patent No. 2,602,769.

It is an object of this invention to prepare the novel 3β,11α-dihydroxy-5-pregnene-7,20-dione and 3β,11α-diacyloxy-5-pregnene-7,20-diones. Other objects of the invention will be apparent to those skilled in the art to which the invention pertains.

The thermostable compounds of the present invention have exhibited pharmacological proportion such as anti-hypertensive, anti-estrogenic, anti-progesterone, anti-testoid, anti-folliculoid, and anaesthetic activities. Furthermore the esters of the present invention are a readily purified derivative of 3β,11α-dihydroxy-5-pregnene-7,20-dione. The esters of the present invention, by reacting the ester with a mild alkali to obtain the non-esterified 3β,11α-dihydroxy-5-pregnene-7,20-dione, and oxidation of the thus-obtained compound, for example, with chromium trioxide in acetic acid, yields 3β-hydroxy-5-pregnene-7,11,20-trione.

In the process of the present invention the starting 3β,11α-dihydroxy-5-pregnene-7,20-dione is admixed with an acylating agent such as, for example, ketene, ketenes of selected acids, selected acids, acid anhydrides, or acid chlorides, in an organic solvent such as pyradine or the like. The thus-described acylation process is productive of the mono, and di-esters of 3β,11α-dihydroxy-5-pregnene-7,20-dione although in different proportions, depending upon the proportions of acylating agent to 3β,11α-dihydroxy - 5 - pregnene-7,20-dione. Using one molar equivalent of acylating agent to said steroid produces primarily the monoacylated product, about two molar equivalents is productive of predominantly the di-ester of 3β,11α-dihydroxy-5-pregnene-7,20-dione.

The following examples will serve to illustrate the process and products of this invention, but the said invention is not to be considered as limited thereto.

PREPARATION 1.—3β,11α-DIHYDROXY-5-PREGNENE-7,20-DIONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Eight liters of this sterilized medium was inoculated with Rhizopus arrhizus ATCC 11145, and incubated for nineteen hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a nineteen hour growth of Rhizopus arrhizus was added two grams of pregnenolone (3β-hydroxy-5-pregnene-20-one) in twenty milliliters of acetone to provide a suspension of the steroid in the culture. After an additional 75 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with four liters of methylene chloride and then with three two-liter portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation leaving 3.3162 grams of crystalline residue. This residue was dissolved in 200 milliliters of benzene and chromatographed over 100 grams of alumina (acid washed, dried at 120 degrees centigrade for four hours). The column was developed with 200 milliliter portions of solvent as indicated in Table I.

Table I

| Fraction | Solvent | Eluate Solids Milligrams |
|---|---|---|
| 1, 2 | benzene | 195 |
| 3, 4 | benzene plus 5 percent ether | 70 |
| 5–7 | benzene plus 10 percent ether | 56 |
| 8, 9 | benzene plus 50 percent ether | 11 |
| 10, 11 | ether | 7 |
| 12, 13 | ether plus 5 percent $CHCl_3$ | 8 |
| 14, 15 | ether plus 10 percent $CHCl_3$ | 32 |
| 16, 17 | ether plus 50 percent $CHCl_3$ | 108 |
| 18, 19 | chloroform | 590 |
| 20 | $CHCl_3$ plus 5 percent acetone | 37 |
| 21 | do | 24 |
| 22 | $CHCl_3$ plus 10 percent acetone | 43 |
| 23 | do | 37 |
| 24 | $CHCl_3$ plus 50 percent acetone | 171 |
| 25 | do | 155 |
| 26 | acetone | 399 |
| 27 | do | 110 |
| 28 | acetone plus 5 percent methanol | 244 |
| 29 | do | 125 |
| 30, 31 | acetone plus 10 percent methanol | 118 |
| 32, 33 | acetone plus 50 percent methanol | 73 |
| 34, 35 | methanol | 27 |

Eluate fractions 24 through 27 were dissolved in ten milliliters of methanol and concentrated until crystallization occurred. A few drops of water were added to facilitate completion of the crystallization, the mixture was cooled, and the crystals were filtered free of supernatant liquid yielding 382 milligrams of crystalline 3β,11α-dihydroxy-5-pregnene-7,20-dione having a melting point of 228 to 230 degrees centigrade.

Example 1.—3β,11α-diacetoxy-5-pregnene-7,20-dione

A 54.5 milligram sample of 3β,11α - dihydroxy - 4 - pregnene-3,20-dione was dissolved in 1.5 milliliters of acetic anhydride and 1.5 milliliters of absolute pyridine and maintained at room temperature for 24 hours whereafter the reaction mixture is diluted with 35 milliliters of water and refrigerated for three hours. The resulting crystalline precipitate was removed by filtration, washed with two milliliters of cold water, and recrystallized from one milliliter of methanol to which ether had been added. After two recrystallizations from chloroform-Skellysolve B, petroleum ether, 17.5 milligrams of crystals were obtained which melted at 189 degrees centigrade. Infrared absorption spectrum confirmed the structure; the $k_{235}$ value was 33.42.

*Analysis.*—Calculated for $C_{25}H_{34}O_6$: C, 69.74; H, 7.96. Found: C, 69.80; H, 7.50.

Other representative 3β,11α-acyloxy-5-pregnene-7,20-diones which can be prepared, in the same manner as given in Example 1, include one to eight carbon atom carboxylic acid acyloxy esters of saturated or unsaturated aliphatic carbocyclic, cycloaliphatic, aryl, arylalkyl, alkaryl, mono, di or polycarboxylic acids which form ester groups such as, for example, formyloxy, acetoxy, propionyloxy, dimethylacetoxy; trimethylacetoxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acrylyloxy, cyclohexylformyloxy, the half and di-esters of malonic, maleic, succinic, glutaric, and adipic acids, and the like. The acids may also contain non-interfering substituents, such as mono or poly halo, chloro, bromo, hydroxy, methoxy, and the like, if so desired.

If a mixed ester involving two different acyl groups is desired the 3β,11α - dihydroxy - 5-pregnene-7,20-dione may be partially esterified with one acylating agent and the resulting mono-ester may then be completely esterified with an acylating agent which introduces a different acyl group. Thus 3β-dimethylacetoxy - 11α - β-cyclopentylpropionyloxy-5-pregnene-7,20-dione or other mixed esters of the herein mentioned acid groups may be prepared.

*Example 2.—3β,11α-dipropionyloxy-5-pregnene-7,20-dione*

In the same manner as given in Example 1, 3β,11α-dipropionyloxy-5-pregnene-7,20-dione is prepared using the equivalent proportion of propionic anhydride in place of acetic anhydride.

*Example 3.—3β,11α-dibenzoxy-5-pregnene-7,20-dione*

In the same manner as given in Example 1, 3β,11α-dibenzoxy-5-pregnene-7,20-dione is prepared using the equivalent proportion of benzoyl chloride in place of acetic anhydride.

*Example 4.—3β,11α-dihexanoyloxy-5-pregnene-7,20-dione*

In the same manner as given in Example 1, 3β,11α-dihexanoyloxy-5-pregnene-7,20-dione is prepared using the equivalent proportion of hexanoic anhydride in place of acetic anhydride.

*Example 5.—3β,11α-di(β-cyclopentylpropionyloxy)-5-pregnene-7,20-dione*

In the same manner as given in Example 1, 3β,11α-di(β - cyclopentylpropionyloxy)-5-pregnene-7,20-dione is prepared using the equivalent proportion of β-cyclopentylpropionyl chloride in place of acetic anhydride.

It is to be understood that this invention is not to be limited to the exact details of operation or exact compounds shown and described, as obvious modifications and equivalents will be apparent to one skilled in the art, and the invention is therefore to be limited only by the scope of the appended claims.

We claim:
1. A compound selected from the group consisting of 3β,11α-dihydroxy-5-pregnene-7,20-dione and 3β,11α-dihydroxy-5-pregnene-7,20-dione esters of hydrocarbon carboxylic acid containing less than nine carbon atoms.
2. 3β,11α-dihydroxy-5-pregnene-7,20-dione.
3. 3β,11α - dihydroxy-5-pregnene-7,20-dione ester of hydrocarbon carboxylic acid containing less than nine carbon atoms.
4. 3β,11α-diacetoxy-5-pregnene-7,20-dione.
5. 3β,11α-dipropionyloxy-5-pregnene-7,20-dione.
6. 3β,11α-dibenzoxy-5-pregnene-7,20-dione.
7. 3β,11α - di(β - cyclopentylpropionyloxy) - 5 - pregnene-7,20-dione.

No references cited.